United States Patent [19]

Faul

[11] 4,036,527
[45] July 19, 1977

[54] TRANSPORTATION SEATING CONSTRUCTION AND SYSTEM

[75] Inventor: Thomas L. Faul, Toronto, Canada

[73] Assignee: Otaco Limited, Orilia, Canada

[21] Appl. No.: 622,652

[22] Filed: Oct. 15, 1975

[30] Foreign Application Priority Data

Apr. 10, 1975 United Kingdom ............... 14858/75

[51] Int. Cl.² .............................................. A47C 7/02
[52] U.S. Cl. .................................. 297/454; 297/232; 297/248
[58] Field of Search ............... 297/183, 216, 232, 248, 297/249, 450, 451, 454–456, 458–460; 296/63, 64

[56] References Cited

U.S. PATENT DOCUMENTS

| | | | |
|---|---|---|---|
| 2,564,924 | 8/1951 | Patton | 297/183 |
| 3,101,218 | 8/1963 | Baermann | 297/455 |
| 3,501,200 | 3/1970 | Ohta | 297/454 |
| 3,625,565 | 12/1971 | Barecki | 297/450 |
| 3,630,566 | 12/1971 | Barecki | 297/454 X |
| 3,695,689 | 10/1972 | Babecki | 297/460 X |
| 3,747,979 | 7/1973 | Barecki | 297/451 |
| 3,797,887 | 3/1974 | Barecki et al. | 297/454 |
| 3,873,155 | 3/1975 | Babecki | 297/458 X |
| 3,897,974 | 8/1975 | Barecki | 297/451 |
| 3,907,363 | 9/1975 | Baker et al. | 297/455 X |

FOREIGN PATENT DOCUMENTS

598,207  5/1960  Canada ................................. 297/249

Primary Examiner—James C. Mitchell
Attorney, Agent, or Firm—Sim & McBurney

[57] ABSTRACT

This invention provides a frameless, stress skin seat construction which can be attached without frame members either to others of its kind or to a supporting surface. The seat construction includes a seat pan of sheet metal formed to define beam-portions at opposite sides, a cylindrical portion at the front for load supporting capacity, and a concave upward dished portion in the rear to add torsion resistance. The construction also includes a back pan of sheet metal which is shaped to define rearwardly opening beam portions at opposite sides, a concave forward dished portion in the lower half to add torsion resistance, and a rearwardly opening U-shaped channel at the top for providing beam strength. The two pans are secured together in such a way that a force sufficient to fold the pans together will cause buckling primarily at the joint between them, rather than any buckling in the pans themselves.

19 Claims, 8 Drawing Figures

TRANSPORTATION SEATING CONSTRUCTION AND SYSTEM

This invention relates generally to a seating construction and seating system for use in any application where large numbers of people must be accommodated, and particularly adapted for employment in mass-transit vehicles, such as buses, airplanes, subways, trains, and so forth.

BAKCGROUND OF THE INVENTION

Typical of the prior art problems to which this invention addresses itself are the following:
U.S. Pat. No. 3,797,887, Barecki et al., Mar. 19, 1974;
U.S. Pat. No. 3,619,004, McKernan, Nov. 9, 1971;
U.S. Pat. No. 3,619,006, Barecki, Nov. 9, 1971;
U.S. Pat. No. 3,482,875, Barecki et al., Dec. 9, 1969;
U.S. Pat. No. 3,747,979, Barecki, July 24, 1973;
U.S. Pat. No. 3,632,159, Barecki, Jan. 4, 1972;
U.S. Pat. No. 3,870,363, Barecki, Mar. 11, 1975.

Many of the problems with the prior art relate to the almost universally-adopted construction which involves a seat frame which holds and supports some form of seat shell adapted to receive the body of the passenger. A typical seat frame is shown in FIG. 6 of the Barecki U.S. Pat. No. 3,797,887, while a typical seat shell is illustrated in FIGS. 1-4 of the same patent, including padding or cushion members.

In the past, it has been generally accepted in the industry that some form of seat frame would be necessary in connection with passenger vehicle seats, in order to provide the requisite strength and load-carrying capacity. Most areas on the North American continent provide for rigorous tests to be applied to seating construction before it can be installed and utilized in public transit vehicles. A typical test for a "two-wide" wall supported and cantilevered seat construction involves subjecting the seat to an impact from behind by a 600-pound weight travelling at a specified speed. The seat construction must absorb a specified amount of energy without buckling, while a high-energy impact must cause buckling or bending primarily or only at the joint between the back section and the seat section, instead of crumpling or buckling the back or seat portions themselves.

These high standards for bending resistance and load capacity have resulted in the current tendency to provide seating constructions utilizing seat frame supporting seat shells. From the disclosures of the above-referenced patents, it is quite clear that the industry has persuaded itself that only the provision of a seat frame can satisfy the rigorous strength requirements which the relevant authorities have established.

One of the primary disadvantages of any need to provide a seat frame in addition to a seating shell is the additional expense involved. Furthermore, since for double or triple seat complexes the seat frame almost invariably spans all of the seats, the double or triple seat construction when assembled is bulky and difficult to manoeuvre. If the seat shells and the seat frame are assembled together and to the vehicle at the same time, considerable man-hours are required for the assembly in situ. If the double or triple seat construction is assembled at a factory and then later installed in a vehicle, the assembly man-hours are still required (although in a different location), and in addition the completed item is bulky, heavy, and very awkward to move into its proper location.

Another difficulty related to the prior art has to do with handhold locations or "grab" bars and rails associated with the seating construction. It is usually considered desirable (and in some areas it is required by law) to provide some form of rail or "grip" which a seated passenger can use to steady himself as he stands up, and which a standing passenger can also hold to maintain balance. A typical provision is that shown in the U.S. Pat. No. 3,979,887, referred to above, which involves a bar or rail securely fixed to the seat frame, and raised above the seating shell far enough to permit it to be held in the hand. Aside from the rather awkward, utilitarian and unaesthetic appearance of hand rails of this type, there have been the more serious disadvantages of the risk of hands, wrists and arms being caught between the bar or rail and the top of the seat proper, not to mention entanglement with handbag straps, umbrellas, coat buttons and so forth. Additionally, during accidents or sudden stops of the vehicle a passenger sitting behind such a bar is in serious danger of damage to his face, and particularly the teeth due to impact with such a rail, which is ordinarily unpadded and uncovered. Finally, since the hand bar or rail represents an additional element in the construction of the seat, it naturally represents an additional expense.

A further disadvantage in the prior art constructions had to do with a tendency to apply the cushion or padding material in such a way that it was firmly affixed or adhered to the seating shell, in order to minimize the risk that it might be stolen, ripped or vandalized in same way. Typically, this called for the provision and affixing of the padding or cushion material directly to the seat shell prior to the installation of the seat shell on the seat frame. Due to this necessity, any flexibility with regard to particular patterns or colours for the cushion or padding material was severely restricted. For example, if a transport bus manufacturer were to receive an order for a vehicle having a specific one of, say, a dozen or more different types and colours of cushion material on the seats, probably also calling for a specific "matching" colour or pattern for the floor carpeting in the interior, all such interior decoration would have to be carried out after the order was received (since it clearly would not be practical to keep on stock a large number of completed vehicles with their interiors finished in all of the different patterns and varieties offered). In the past, this procedure has usually meant that at least the seat shell with the cushions firmly and non-removably affixed thereto had to be installed after the order was received, and this invariably represented a delay in the delivery of the vehicle. In some cases, where the entire seat combination including the seat frame, the seat shells and the cushions were assembled into complete units outside the vehicle and stored, it has been necessary to install all of the seating in the vehicle after the order is received. Furthermore, either of the just-mentioned methods required a very large storage space for storing the pre-assembled seating modules in the various different colours, patterns, etc. offered by the manufacturer.

In view of the foregoing difficulties and disadvantages in the prior art, this invention addresses itself to the provision of a seat construction for transit vehicles in which the seat frame familiar in the prior art is dispensed with due to a particular shape and configuration of the seating shell, which configuration is capable of developing sufficient strength and buckle-resistance to meet the standards generally applied to such structures. In effect, the stress-resisting properties of the prior art seat frames are taken by the skin of the seat shell itself, whereby a "stressed skin" construction is provided. This is similar to what occurs in many modern aircraft, in which at least a portion of the strength of the craft resides in its skin, thus minimizing the additional frame members required to bring the body up to design strength.

This invention also addresses itself to the provision of a seat construction for transit vehicles which integrally incorporates one or more "handhold" locations which are free of the disadvantages of the prior art grab rails discussed previously. Finally, this invention addresses itself to the provision of a seat construction for transit vehicles in which the padding or cushion members or designed in such a way as to minimize the risk of theft, damage or vandalism, and moreover are designed so that they may be affixed to the remainder of the seat construction after the seat construction has been assembled together and installed in the vehicle, such that the time elapsing between the selection of a particular pattern or colour scheme for the interior decoration of the vehicle and the delivery of a vehicle fitting the desired specifications is very substantially reduced. Moreover, the requirement for storing only the cushion or padding elements obviously decreases the amount of storage space necessary for a manufacturer of transit vehicles.

GENERAL DESCRIPTION OF THIS INVENTION

Accordingly, this invention provides a frameless, stressed skin seat construction adapted for direct attachment without frame members either to others of its kind or to a support component, comprising: an integral sheet metal seat pan formed to define (a) inverted U-shaped portions at opposite sides for contributing beam strength to the sides, (b) a convex upward cylindrical surface spanning the front for providing load supporting capability to the front, and (c) a concave upward dished portion in the rear half of the seat pan for providing torsion resistance to the seat pan as a whole; an integral sheet metal back pan formed to define (d) rearward opening U-shaped portions at opposite sides for contributing beam strength to the sides, (e) a concave forward dished portion in the lower half of the back pan for providing torsion resistance to the back pan as a whole, and (f) a rearwardly opening U-shaped channel at the top for providing beam strength to the top; and means for securing the seat pan and back pan together such that sufficient force exerted to fold the pans together will cause buckling of said means rather than bending of said pans.

GENERAL DESCRIPTION OF THE DRAWINGS

Several embodiments of this invention are shown in the accompanying drawings, in which like numerals denote like parts throughout the several views, and in which.

DETAILED DESCRIPTION OF THE DRAWINGS

Figure 1:
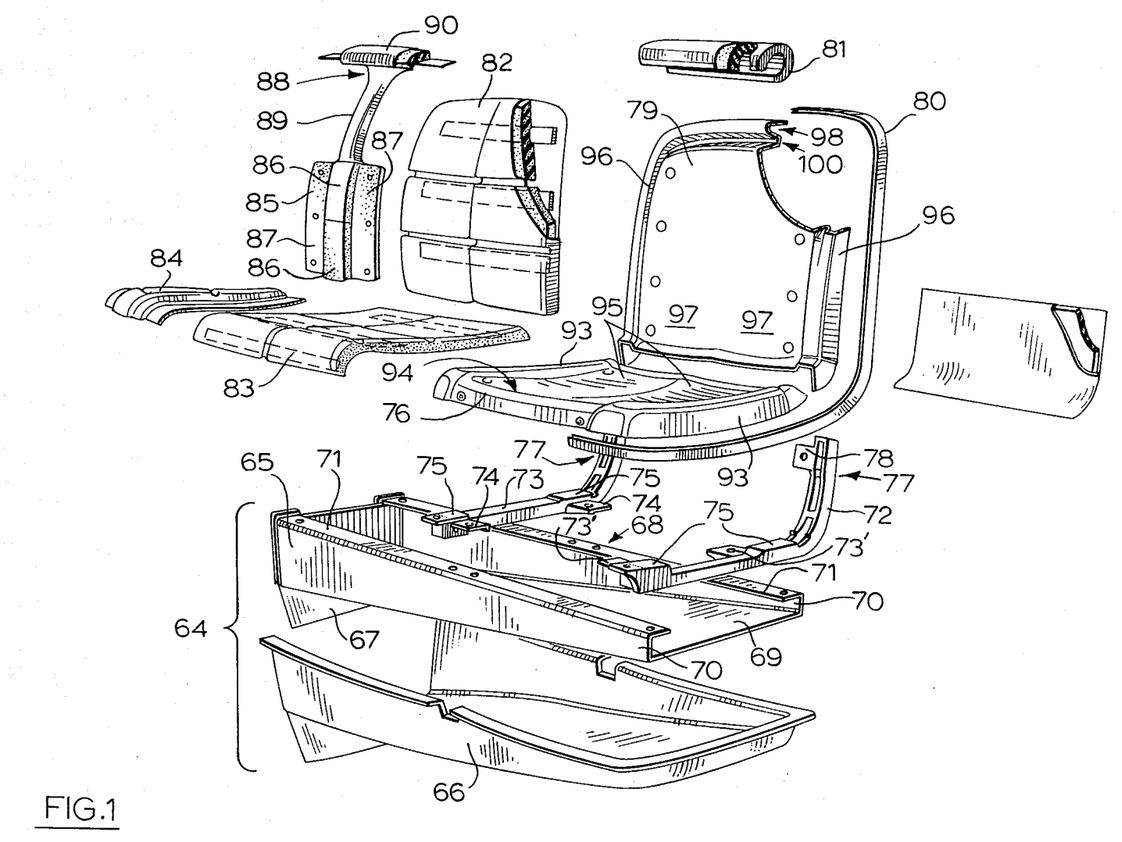
FIG. 1 is a perspective, exploded view of a seating assembly in accordance with the first embodiment of this invention.

Attention is first directed to FIG. 1, which is an exploded perspective view of the first embodiment of the seat assembly of this invention. In FIG. 1, a cantilevered base unit shown generally at 64 consists of an inner structural member 65 and an outer ornamental member 66. The structural member 65 includes a wedge-shaped attachment section 67 and a cantilevered section 68. The attachment section 67 includes means (not shown) for connection with suitable rails, brackets, or other means affixed to an upstanding side wall of a vehicle such as a bus or train. The cantilevered section 68 has a bottom wall 69, side walls 70 and inwardly extending flanges 71. The side walls 70 are tapered as can be seen in the Figure.

The ornamental portion 66 may be of plastic, and is adapted snugly to receive and enclose the structural portion 65.

Adapted for attachment to the flanges 71 of the structural portion 65 are a first bracket member 72 and a second bracket member 73. The bracket member 72 is adapted to be securely fixed to the flanges 71 at their rightward ends as seen in FIG. 1, and to this purpose is provided with laterally projecting members 73 which have apertures adapted to register with similar apertures at the rightward ends of the flanges 71. Suitable fastening means such as bolts or rivets would be utilized to secure the bracket member 72 to the flanges 71.

The bracket member 73 is also provided with laterally projecting members 74, and these are adapted to register with apertures located at an intermediate position along the flanges 71, the latter apertures being visible in FIG. 1. Again, suitable fastening means could be provided to secure the bracket member 73 to the flanges 71.

Both brackets 72 and 73 have upwardly projecting plateau portions 75 upon which a seat pan 76 is adapted to rest. As seen in FIG. 1, the seat pan 76 is provided with apertures adapted to register with corresponding apertures in the plateau portion 75, again for the purpose of fastening as by rivets, bolts, etc.

Both of the bracket members 72 and 73 are shaped to define rearwardly located upstanding portions 77, each of which is provided with a laterally extending tab 78 (only one visible in FIG. 1), the latter being intended to support and to be affixed to a back pan 79 which is manufactured and shaped in a similar manner to the seat pan 76.

Particular attention is now directed to the seat pan 76 and back pan 79 shown in FIG. 1. Although the overall strength of the seating assembly shown in FIG. 1 is partly due to the brackets 72 and 73, it is also contributed to importantly by the natural strength, bend resistance and torsion resistance of the seat pan and back pan due to the particular configuration thereof.

The seat pan 76 is essentially an integral sheet metal pan formed to define inverted U-shaped portions 93 at opposite sides for contributing beam strength to the sides, a convex upward cylindrical surface 94 spanning the front of the seat pan for providing load supporting capability to the front, and two concave upward dished portions 95 in the rear half of the seat pan for providing torsion resistance to the pan as a whole. It will be understood that, whereas a flat sheet member may be twisted torsionally to a limited extent (depending upon its thickness), the degree of twisting possible for a surface which is concave, i.e. which has two degress of curvature and the curvature is positive, is much more limited. It is thus seen that the provision of certain specific formations in the stamping and initial shaping of the seat pan 76 renders the same of sufficient strength to contribute strongly to the overall strength of the seat construction.

Similarly, the back pan 79 is an integral sheet metal pan formed to define rearward opening U-shaped portions 96 at opposite sides for contributing beam strength to the sides, two concave forward dished portions 97 in the lower half of the back pan for providing torsion resistance to the back pan as a whole, and a rearwardly opening U-shaped channel 98 at the top for providing beam strength to the top. The characteristics just described for the back pan 79 provide considerable strength characteristics to the pan, and contribute importantly to the overall strength of the seating construction shown in FIG. 1.

The rearwardly opening U-shaped channel 98 formed at the top of the back pan 79 is capable of functioning as a hand-hold location, and to this end the back pan 79 includes a rearwardly extending recess 100 immediately below the U-shaped channel 98 (the two together forming a kind of S-shape). Not only does the recess 100 permit the fingers of a passenger located behind the seat to obtain a firm grip on the U-shaped channel 98, but the additional "folding" of the sheet metal adds further strength to the upper boundary of the back pan 79.

It is specifically contemplated that the beam strength built into both seat pan 76 and the back pan 79, taken together with the brackets 72 and 73, will be such that the application of a force sufficient to fold the pans together by urging forwardly from behind the top of the back pan, will cause buckling of the joint or "elbow" between the seat pan 76 and the back pan 79, rather than the bending of either pan.

The construction shown in FIG. 1 also includes an edge-protecting member 80 which may be of metal or plastic. The member 80 is a channel-shaped or U-shaped item in cross section, and is adapted to receive the free edges of the seat pan 76 and back pan 79.

The upholstery for the seat construction shown in FIG. 1 includes a padding member 81 adapted to be received over the central portion of the top of the back pan 79, and to be affixed thereto by any conventional attachment means. The padding member 81 may be grasped from behind by a passenger located there. The upholstery portion of the assembly is also seen to include a back cushion 82, a seat cushion 83, an intermeidate seat filler 83, and an intermediate back filler 85. The back cushion 82 and the seat cushion 83 are preferably affixed to the respective pans by releaseable means which are also such as to make for quick assembly, such that the cushions may be applied against the respective pans as the last step in assembly. As can be seen in FIG. 1, the intermediate back filler 85 includes two lower padded portions 86 which are secured to side flanges 87, the latter being intended to be attached to the two adjacent back pans 79 of two adjacent seats (only one seat is shown in FIG. 1). The intermediate seat filler 84 is of a similar construction. The intermediate back filler 85 also includes an upstanding T-shaped portion 88 which has a central stem 89 and an upper padded portion 90. These latter portions are also attached to suitable sections of the adjacent seats by any conventional means.

The construction and configuration just described in connection with FIG. 1 constitute a very satisfactory way of achieving the requisite strength characteristics in a seating assembly while utilizing minimum structural support members (72 and 73). In fact, utilizing typical sizes and gauges for the sheet materials and metal members of FIG. 1 tends to result in a seating structure which is overstructured in terms of its strength. In other words, the provision of the "stressed skin" seat pan construction together with the additional strength provided by the brackets 72 and 73 provides in most cases an appreciable degree of strength beyond that required by typical specifications set for transit vehicles and the like. The subsequent embodiments of this invention now to be described take advantage of the great inherent strength of the "stressed skin" construction of the seat pans, dispensing with the need for members equivalent to the brackets 72 and 73 and the undergirding base unit 64, and providing instead two adjacent back-up pans secured respectively to the seat pan and the back pan in order to increase the strength of the latter still more, and to meet the requisite specifications for strength, impact-absorbing capability, and so forth.

Figure 2:
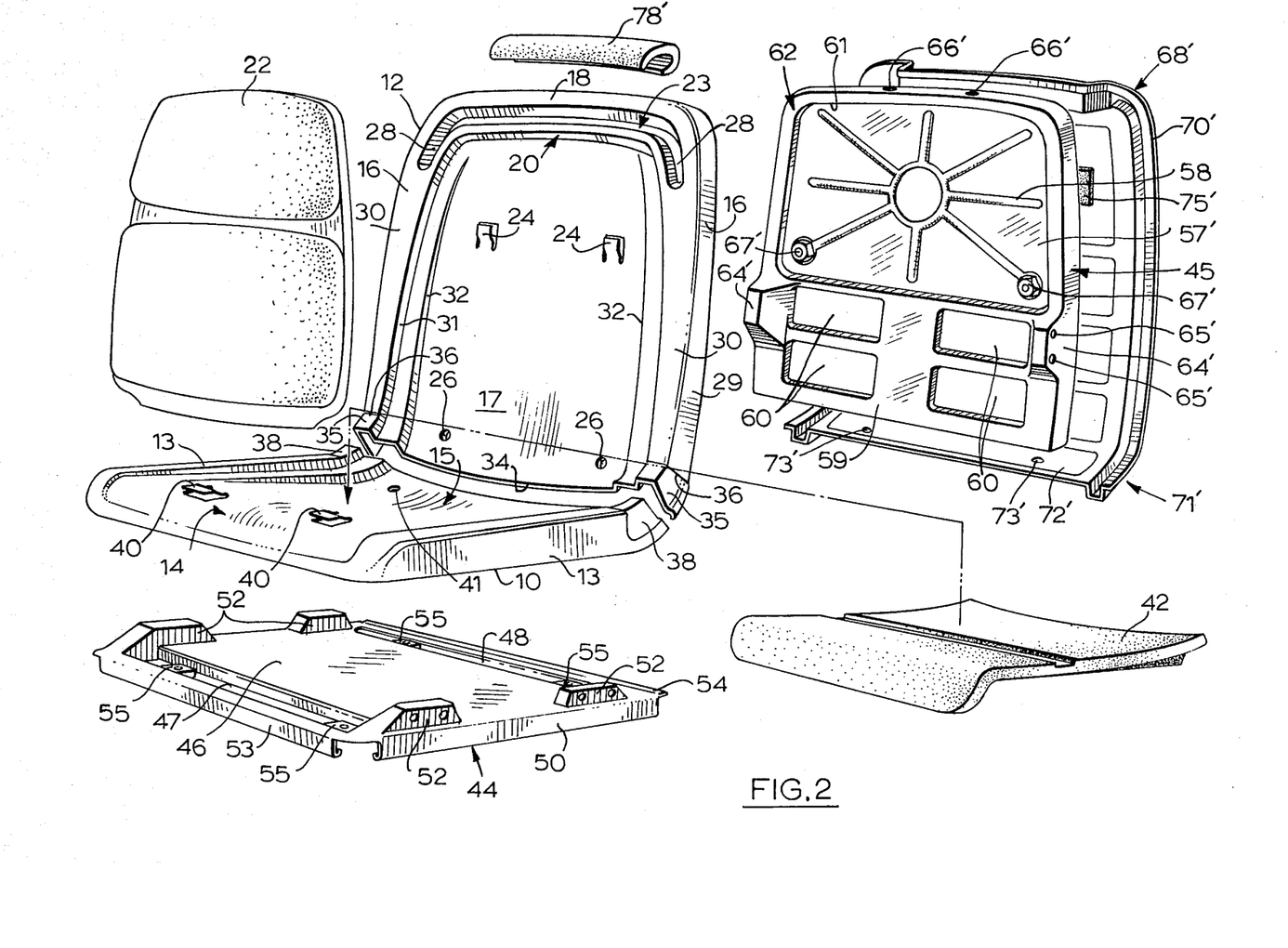
FIG. 2 is a perspective, exploded view of a seating assembly in accordance with the second embodiment of this invention.

Attention is now directed to FIG. 2, which illustrates a second embodiment of this invention.

As just mentioned, the construction of FIG. 2 is adapted to be utilized without any supporting or strengthening space frame or bracket members, and includes the provision of back-up pans shortly to be described.

Turning first to the main sheet metal pans, it will be seen that there is provided a seat pan 10, and a back pan 12. The seat pan 10 is essentially similar to the seat pan in FIG. 1, and thus is provided with inverted U-shaped portions 13 at opposite sides for contributing beam strength to the sides, a convex upward cylindrical surface 14 spanning the front for providing load supporting capability to the front, and a concave upward dished portion 15 in the rear half of the seat pan 10 for providing torsion resistance to the seat pan as a whole.

Likewise, the back pan is similar in construction to the back pan shown in FIg. 1. More specifically, the back pan 12 is an integral sheet metal pan formed to define rearwardly opening U-shaped portions 16 at opposite sides for contributing beam strength to the sides, a concave forward dished portion 17 in the lower half of the back pan 12 for providing torsion resistance to the back pan as whole, and a rearwardly opening U-shaped channel 18 at the top of the back pan for providing beam strength to the top.

Additionally, the back pan 12 also defines an L-shaped portion 20 which is spaced below the rearwardly opening U-shaped channel 18 and is adapted to receive in abutment the upper periphery of a padding member 22, also shown in FIG. 2. The padding member 22 thus does not interfere with the capability of the rearwardly opening U-shaped channel 18 to function as a hand-hold location by which a person may grasp the back of the seat, and prevents the pad from being pulled off by vandals.

Still more particularly, the back pan 12 also defines a rearwardly extending recess 23 between the L-shaped portion 20 and the rearwardly opening U-shaped channel 18 for receiving the fingers of a person grasping the back of the seat. Just as in the first embodiment of this invention shown in FIG. 1, the rearwardly extending recess 23 and the U-shaped channel 18 cooperate together to define an S-configuration for the sheet metal, which further enhances and increases the strength characteristics at the top of the back pan 12.

It is contemplated that the padding member 22 will be provided with a relatively stiff sheet material on its far side as seen in FIG. 2, which is the side which goes directly against the back pan 12. This sheet material may be aluminum, a stiff plastic or the like. The sheet or stiff material to which the padding member 22 is adhered or bonded is equipped with apertures adapted to register with pressed-out tongues 24 in the back pan 12, and in effect slide down over the tongues 24 to provide a secure attachment to the back pan 12. The lower end of the padding member 22 is equipped with suitable fastening members projecting outwardly therefrom, which are adapted to register and pass through openings 26 in the lower part of the back pan 12, so that complete securement of the padding member 22 may be effected.

It will be noted that the rearwardly extending recess 23 has a main extent spanning across the top of the seat pan 12, and has two "wing" portions 28 descending part-way down along the U-shaped side portions 16 of the back pan 12.

It will be seen that the U-shaped portions 16 are indeed U-shaped by virtue of a first wall 29 constituting the outer border of the back panel 12, a front wall 30, and a shortened internal wall 31 (seen at the left in the back panel 12), which helps to define the recess into which the padding member 22 fits. Furthermore, the recess itself has a further ledge 32 at either side inwardly spaced from and parallel with the U-shaped portions 16.

The lower free edge 34 of the back panel 12 appears curvilinear in FIG. 2, and this is primarily due to the concave forward "dished" portion at the lower half of the back panel.

At the lower ends of the U-shaped portions 16, there are defined overlapping sections 35, which are indented at 36 for design purposes, as will hereinafter appear.

Turning again to the seat pan 10, the inverted U-shaped portions 13 can be seen to include, at their rearward ends, overlapping sections 38 which are intended to be overlapped and encompassed by the sections 35 of the back pan 12, so that spot welding, riveting or other similar fastening of the two pans together may take place.

The seat pan 10 also includes pressed-out tongues 40 and two rearwardly located apertures 41 (only one visible in FIG. 2), for the purpose of receiving a seat padding member 42 (shown at bottom right in FIG. 2), in exactly the same manner as the padding member 22 is received against the back pan 12, as described above.

As can be seen in FIG. 2, the seating construction of the second embodiment of this invention further includes a first back-up pan 44 under and connected to the sheet metal pan 10, and a second back-up pan 45 behind and connected to the sheet metal back pan 12. The back-up pans are affixed to their respective sheet metal pans but are not affixed to each other, as will be evident from their shape and configuration.

Turning specifically to the first back-up pan 44 which is shown in exploded relation beneath the seat pan 10, the same is seen to include a main horizontal panel 46, bent or stamped to define a forward, upwardly open channel 47 and a rearward, upwardly open channel 48. The channels 47 and 48 are parallel and spaced apart as shown. At either side of the back-up pan 44 is a bent-down wall 50 (only one visible in FIG. 2). Adjacent either end of each wall 50 is an upstanding pocket 52, each of which defines a cavity accessible from beneath the back-up pan. The outer wall of these cavities each have two apertures for a purpose which will later be explained.

Finally, the first back-up pan 44 includes a bent-down forward wall 53, and a rearward flange 54.

It will be seen that the lower edges of the walls 50 and 53 are inwardly and upwardly rolled to form a J shape. When the first back-up pan 44 is inserted beneath and against the seat pan 10, the lower rolled edges of the walls 50 and 53 lie inwardly adjacent and slightly above the lower periphery of the front and sides of the seat pan 10. Also, in assembled condition, the pockets 52 enter the U-shaped portions 13 and the upper surfaces of the pockets 52 come into contact with the under inside surfaces of the U-shaped portions 13. In addition, the rearward central part 15 of the seat pan 10 is juxtaposed against the adjacent part of the back-up pan 44.

To secure the first back-up pan 44 to the seat pan 10, it is preferred first to weld, rivet, staple or otherwise attach the seat pan 10 firmly to the back-up pan 44 in the region 15. Then a roll-forming procedure may be utilized, by which the lower peripheries at the sides and front of the seat pan 10 are curled inwardly and around to grasp and enclose the J-shaped curls at the bottoms of the walls 50 and 53 of the first back-up pan 44.

Figures 6, 7:
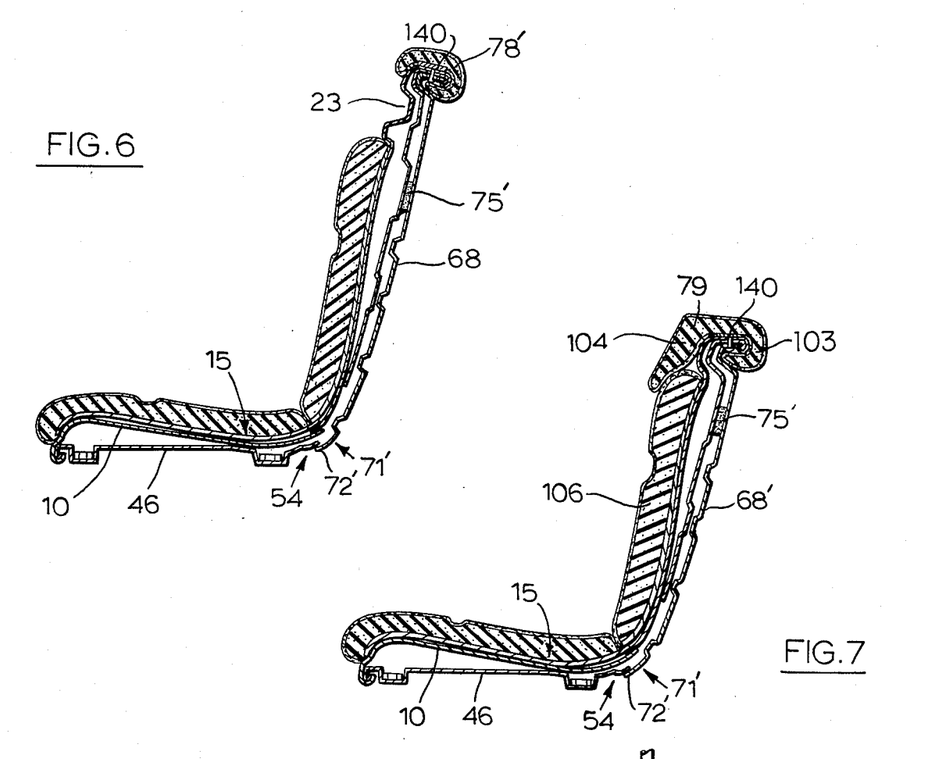
FIG. 6 is a vertical sectional view of the second embodiment of this invention taken at the axis of symmetry of the construction.
FIG. 7 is vertical sectional view of the third embodiment of this invention, taken along the axis of symmetry thereof.

When in assembled condition, the main panel 46 of the back-up pan 44 is generally spaced downwardly beneath the forward part of the seat pan 10, as is particularly seen in FIG. 6. Due to this spacing and due to the secure grip afforded by the attachment in region 15, and by the rolled bottom edges of the seat pan 10 and the first back-up pan 44, there is provided in effect a three dimensional "box"-type enclosure which exhibits extremely high strength characteristics, torsion resistance, and load-carrying capacity.

The channels 47 and 48 not only contribute to the overall strength of the assembly, but receive internally threaded nut-members 55 which are secured within the bottoms of the channels by welding or other appropriate means. Openings are provided in alignment with the internally threaded apertures of the nut means 55, so that fastening members such as bolts and threaded shanks may be screwed into the nut means 55 from beneath, if desired.

Attention is now directed to the second back-up pan 45, which can be seen in FIG. 2 to include an upper flat panel portion 57' having raised ribs 58 to enhance stiffness and avoid 'oil-canning', and a lower flat wall portion 59 having recesses 60, again for stiffness and the avoidance of 'oil-canning'. The upper wall portion 57' is surrounded by a forwardly projecting rim 61, which is also part of a surrounding edge portion 62, which extends outwardly and then rearwardly in such a way that it can fit snugly within the U-shaped portions 16 of the back pan 12. Although not visible in FIG. 2, the free rearward edge at the periphery of the second back-up pan has an inward curl similar to that illustrated at the bottom edges of the first back-up pan in FIG. 2. It is contemplated that the second back-up pan 45 be affixed to the back pan 12 in the same manner as takes place for the seat pan 10, i.e. by roll-forming the juxtaposed free edges together inwardly and forwardly, after first welding or mechanically affixing the back-up pan 45 to the back pan 12 near the center of portion 59 (where the back pan 12 and back-up pan 45 are juxtaposed). This adds to the torsional rigidity of the "box"-type structure defined by the back-up pan 45 and the back pan 12.

In FIG. 2, the second back-up pan 45 can be seen to include two forwardly projecting pockets 64', each defining a cavity accessible from behind, and each having two vertically spaced apertures 65'. The pockets 64' are intended to extend all the way to the front wall 30 of the U-shaped portions 16 of the back pan 12, and to come into contact therewith. Such contact does not occur between the front wall 30 of the U-shaped portions 16 and other parts of the periphery of the second back-up pan 45.

The second back-up pan 45 has two nut members 67' welded to the upper wall portion 57' and has, at its top edge, two apertures 66' for a purpose subsequently to be explained.

Finally, there is shown in FIG. 2 a rear cover panel 68' which is provided with a peripheral flange 70' sized and shaped to snap in behind the bead created when the free juxtaposed edges of the back pan 12 and the second back-up pan 45 are roll-formed together. The cover panel 68' may have any desired configuration, texture and colour, and is intended primarily to provide an attractive appearance to the seat construction from the rear, although it may be utilized to provide a resilient protective covering for the safety of a passenger located behind the seat construction. The panel 68' is shaped at the bottom to define a forwardly curving portion 71' which as can be seen particularly in FIG. 6, is adapted to have its lower, forward edge portion 72' come adjacent the flange 54 of the first back-up panel 44. By virtue of two apertures 73' in the panel 68', together with corresponding apertures in the flange 54 (not illustrated), the panel 68' may be secured to the flange 54. To enhance the resilience of the panel 68', there may be provided one or more resilient pads 75' shaped and sized in such a way as to contact the panel 68' on one face and the second back-up pan 45 on the other face.

Figures 4, 5:
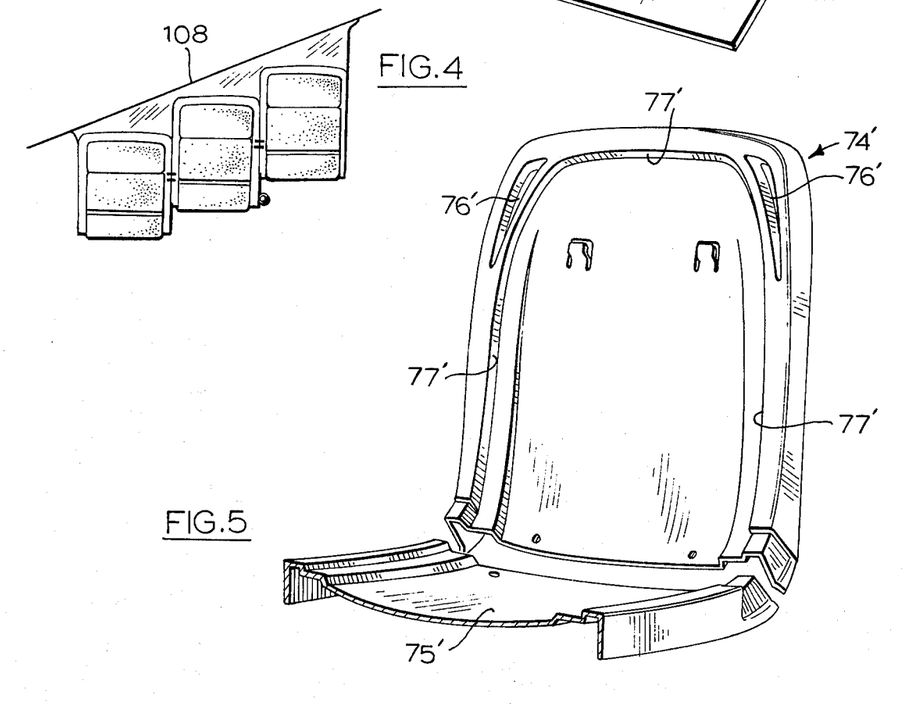
FIG. 4 is a plan view of the arrangement of FIG. 3.
FIG. 5 is a perspective view of a portion of the third embodiment of this invention, showing one of the parts sectioned.

Attention is now directed to FIG. 5, which illustrates the third embodiment of this invention. Essentially, the third embodiment differs from the second embodiment mainly in the configuration of the back pan identified in FIG. 5 by the numeral 74'. Also shown in FIG. 5 is a portion of a seat pan 75", which has been transversely sectioned in order to illustrate the configuration thereof. The seat pan 75" does not differ in any significant way from the seat pan 10 of FIG. 2.

Turning now to the back pan 74', it will be seen that the transverse recess at the top has been eliminated, and that instead there are provided two lateral recesses 76' which serve the same function as the recess 23 in FIG. 2, namely to receive the fingers of a passenger grasping the corners of the seat for support. In FIG. 5 an internal ledge 77' defines the periphery of a recess adapted to receive a padding or cushion member similar to the member 22 shown in FIG. 2.

In all other respects except one, the seating construction for the third embodiment of the invention is the same as that already described for the second embodiment shown in FIG. 2. The exception relates to a padding member which may optionally be provided to fit centrally against the top of the back pan. In the second embodiment of the invention shown in FIG. 2, a padding member 78' is formed as C-shaped channel and is adapted to cover the top wall of the back pan, with portions descending part-away down along the front and around and under the back, as particularly seen in FIG. 6. The padding member 78', however, does not interfere with or block the recess 23, and therfore does not stand in the way of a passenger obtaining a good and secure grip on the top of the back pan. By comparison, since the third embodiment of this invention has eliminated the central part of the hand-hold recess at the top of the back pan, it is possible to provide a padding member shown in section in FIG. 7 by the numeral 79 which is somewhat like a J in configuration, and which has a first leg 103 descending downwardly and under the rear top of the back pan, and a second leg 104 descending downwrdly along the top front of the back pan, and overlapping a cushion member 106 similar in all respects except possibly size to the member 22 shown in FIG. 2. It is contemplated that the padding member 79 be shaped and sized in such a way as to provide a headrest for a passenger sitting in the seat.

Figure 3:
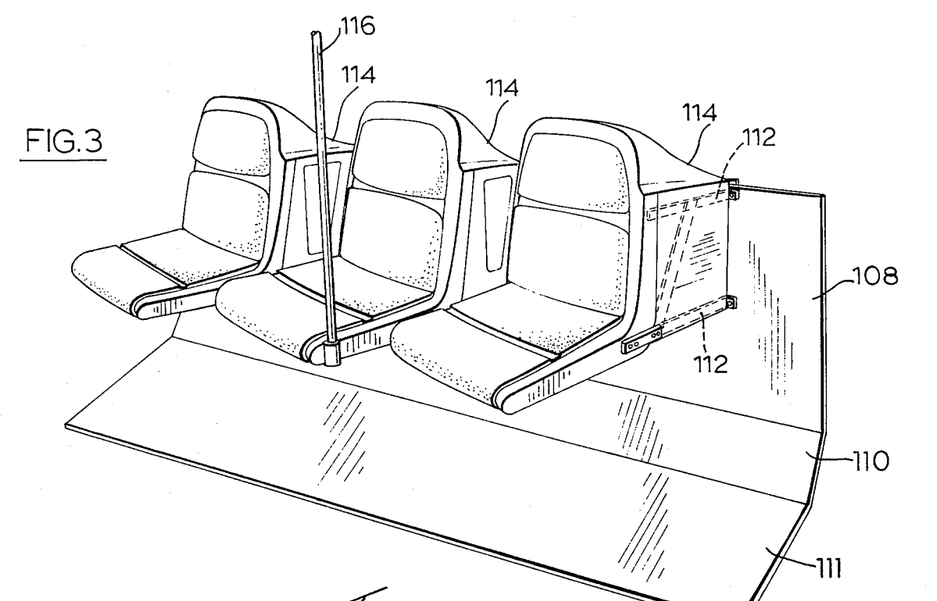
FIG. 3 is a perspective view of three seat constructions according to the second embodiment affixed in diagonal relationship to each other and to the wall of a vehicle.

Attention is now directed to FIGS. 3 and 4, which illustrate an oblique manner of affixing individual seats to a vertical wall of a vehicle, which is shown schematically as wall 108 in the Figures. At the bottom of the wall 108, there is a forwardly and downwardly sloping panel 110, which joins the horizontal floor 111. It is to be understood that an arrangement such as that shown in FIGS. 3 and 4 is made possible by the fact of providing the two pocket areas 52 along the first back-up pan of each seat construction. It will be appreciated that the seats are connected together by first bringing a forward pocket region of one seat into juxtaposition with a rearward pocket region of the next seat, along the adjoining sides, and then by utilizing one or two fastening members to secure the juxtaposed pocket regions 52 together. Prior to such connection, one or two openings would have to be punched or bored through the outer wall of the U-shaped portions of the seat pan of the construction (for example the seat pan 10 shown in FIG. 2). In this connection, it is pointed out that the outer wall of the U-shaped portions 13 are intentionally made without openings or apertures at the time of original manufacture, in order to avoid leaving unsightly holes in the seat in situations where particular pocket regions 52 are not utilized. For example, in the oblique arrangement of FIGS. 3 and 4, any previously punched holes corresponding to the apertures in the forward leftward pocket region 52 (leftward to a person sitting in the seat) would be visible and unsightly.

As particularly seen in FIG. 3, supporting structure, brackets and so forth identified by the numeral 112 may also be provided, in order to space and hold each seat firmly in relationship to the wall 108. Furthermore, a shroud or mask 114 may be provided for each seat, in order to hide the supporting structure behind the seat, and to give the complex an agreeable appearance. Due to the arrangement of the seats, no hand-grip recesses are needed in the FIG. 3 arrangement, and none has been shown.

In FIG. 3 a stanchion 116 is pictured, extending downwardly from the roof of the vehicle (not illustrated) to the front leftward corner of the middle seat. It will be appreciated that the connection between the bottom of the stanchion 16 and the seat is facilitated by providing the forward leftward pocket region 52 on the first back-up pan. Again, the connection would be made by first punching or drilling holes in the outer wall of the U-shaped portion 13 of the seat pan to allow fastening members to be inserted for the attachment of the bottom portion of the stanchion 116.

It will be understood that the structure shown in FIG. 3 utilizes the forward pocket regions in the first back-up pans only for interconnection of the adjacent seats, and not really for the purpose of supporting the individual seats from the wall 108. For the latter purpose, the pocket region 64' in the second back-up pans are utilized in conjunction with rearward ones of the pocket regions 52 in the first back-up pans. This is best illustrated on the "near" side of the rightward seat in FIG. 3. There may be particular applications, however, where it is not feasible to utilize the pocket region 64' of the second backup pan, for example where the lower edge of a window comes down below the normal attachment location for a bracket extending from the pocket region 64'. In such cases, and due to the great natural inherent strength of the stressed-skin construction of this invention, it is possible to utilize stanchions such as the stanchion 116 at intervals along the row of angled seats to support the frontward corners of selected seats and thus constitute a second "holding point", in conjunction with the lowermost of the brackets extending at the level of the seat pan to the rear toward the wall 108. Thus, a construction is achieved in which the seats and the stanchions mutually support each other. Naturally, this construction has the particular advantage of keeping all portions upwardly off the floor 111, which makes the vehicle easier to clean and increases the safety factor.

Figure 8:
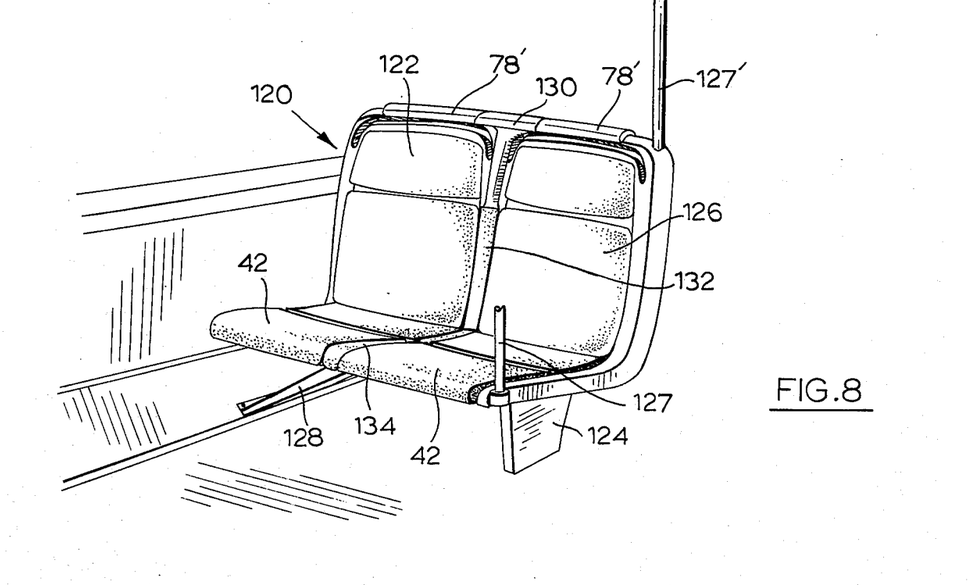
FIG. 8 is a perspective view of two seats in assembled, side-by-side construction, representing the second embodiment of this invention.

FIG. 8 shows two seats in side-by-side relation, it being understood that the adjacent edges of the two seats would be firmly secured together by way of fastening members locking the juxtaposed pocket regions 52 and 64' together, after first punching or drilling appropriate holes in the outer walls of the U-shaped portions of the two pans. By affixing together all three pairs of juxtaposed pocket regions, a three-point rigid attachment of the one seat construction to the other would be accomplished. The considerable strength of the stress skin construction of the two seats as described previously will result in an extremely rigid and strong double seat. The double seat may be connected to the vehicle by any or a combination of five possible ways. The first way would be to utilize the three pocket regions 52, 64' at the "wall" edge 120 of the window seat 122 in FIG. 8, connecting these pocket regions through the adjacent outer wall of the U-shaped portions directly to the vehicle wall, by way of brackets, rails, or other standard and well known means. Such a three-point attachment would develop sufficient strength to meet the usual specifications.

If, for example, it is not possible to connect the pocket region 64' of the back pan through to the vehicle wall (due, for example, to the presence of the vehicle window at that height), it will be clear that a connection only at the seat-pan level will not be sufficient to permit the seats to be cantilevered outwardly without some further support. Additional means of support are shown in FIG. 8, although it is to be understood that, in all likelihood, only one of these supports would be utilized in any given installation. The first support means is constituted by a pillar 124 which extends upwardly from the floor of the vehicle to the aisle side of the aisle seat 126. The connection between the pillar 124 and the seat 126 may be accomplished by means of the internally threaded nut means 55 located within the channels 47, 48 of the first back-up pan 44 (see FIG. 2).

Another means of support is illustrated in FIG. 8 as an oblique member 128 extending upwardly from the edge of the floor or the bottom of the wall to a location somewhere in the region of the joint between the two seats 122 and 126. The connection between the support 128 and the seats may be made utilizing the nut means 55 of either seat adjacent the location where they are joined together, or alternatively may be made to an L-beam length having a vertical flange sandwiched between the two seats 122 and 126 and having a horizontal flange extending toward or away from the wall under one of the seats. The flanges would be provided with suitable openings to facilitate the various connections called for.

Yet another means of support is illustrated in FIG.. 8 as a stanchion 127 connected to the forward leftward corner (leftward to a person sitting in the seat) of the rightward seat pan as seen in the Figure. The attachment to the bottom of the stanchion 127 would be made by way of the appropriate pocket region 52 of the respective first back-up pan 44, with a fastener extending through the seat pan edge itself. The stanchion 127 has not been shown in its full length, in order to avoid covering up other parts of the figure.

Another location for the connection of a stanchion is at the upper outside corner of the aisle seat, this being illustrated by a stanchion 127'. The connection at the bottom end of the stanchion 127' could be by way of a hole bored or punched through the back pan and the second back-up pan at that location, along with a centrally bored and tapped insert welded or otherwise lodged internally at the bottom of the stanchion 127'. A curved plate member functioning as a washer would be placed against the under inside upper edge of the second back-up pan, with a bolt or similar threaded member passing through it, through the holes in the seat pan and the second back-up pan, and then into the insert lodged in the bottom of the stanchion 127'.

FIG. 8 also illustrates certain additional padding portions which may optionally be provided for the situation arising when two or more of the seats are connected together in side-by-side relation. One such member is a T-shaped pad 130 adapted to span between the two padding members 78' (corresponding to the member 78' shown in FIG. 2). The second additional portion is a lower back insert 132 which may be separate from the T-shaped member 130 or may be connected thereto.

The last additional member is a seat insert 134.

It is preferred that the inserts 132 and 134 both be constructed in the same manner as the corresponding parts in FIG. 1, i.e. with wing portions intended to be entrapped between the adjacent padding or cushion members and the respective seat or back pan, so that all portions of the padding for the seat construction can be affixed to the pans after the pans are securely in place in the vehicle. This construction makes possible a very high degree of flexibility in terms of meeting orders for specific colours with a minimum of delay, as described earlier.

It is also to be understood that the panel 68' shown in FIG. 2 will ordinarily be the last member to be affixed to the seating construction. In other words, the panel 68' will be affixed after the padding or cushion members are in position. This order of assembly is required due to the fact that the main padding members 22 and 42 (see FIG. 2) are affixed to the respective pans through apertures which are accessible between the back-up pans so long as the panel 68' is not yet in place. The positioning of the panel 68' as shown in FIGS. 6 and 7 effectively covers up the location of attachment of the padding members through apertures 26 and 41, and prevents vandals from quickly loosening the same.

It will not be appreciated that the seating construction of this invention, in addition to the advantages already discussed, provides the additional advantage of not requiring any welding or similar metallurgical connection between the seat pan and back pan, on the one hand, and the respective back-up pans on the other. For this reason, each back-up pan may be manufactured of a metal which is metallurgically incompatible with the metal of the main pan, without any serious problem arising. This is due to the fact that a secure connection between each back-up pan and its respective main pan can be achieved mechanically, without requiring any metallurgical bond.

Though it has been stated that welding and similar metallurgical bonds may be avoided by the construction disclosed herein, it is to be understood that it is not essential that they be avoided. Naturally, where a back-up pan is metallurgically compatible with its respective main pan, there is no reason why spot welding, tack welding, etc. should not be used if it is considered appropriate. The advantage being referred to is the fact that, if desired, all of the strength-providing attachments between the back-up pans and their respective main pans may be carried out mechanically. In this connection, although roll-forming at the adjacent and juxtaposed edges of the main pans and the respective back-up pans has been specifically disclosed, it will be understood that a number of other mechanical processes could also be employed. For example, riveting, stapling, double-folding (as in tin cans), and similar techniques could be utilized.

Finally, it is pointed out that the apertures 66' shown particularly in FIG. 2 are intended to be utilized whenever a padding member such as that shown at 78' in FIG. 2 and FIG. 8 is to be connected to the seat construction. Prior to such connection, appropriate holes aligned with the apertures 66' would be punched or bored in the upper wall at the top of the seat pan, and then fastening members would be inserted for connection with the padding member 78' or 79 as the case may be. As can be seen in FIGS. 6 and 7, each of the padding members 78', 79 is secured to an underlying sheet member 140 which may be of aluminum, plastic, or the like, and which may be provided with suitable nut means or the like for the purpose. Alternatively, the sheet member 140 may support a downwardly projecting bolt shank, adapted to pass through the aligned openings at the top of the seat pan, whereupon suitable nuts may be applied from underneath. After attachment as just indicated, the "tail" portions of either padding member 78' or 79 (as the case may be) is then able to "snap" back inwardly and forwardly to cover the attachment means, and avoid unauthorized removal.

It will be seen that the construction disclosed herein is such that a given seat pan configuration can be provided, which is compatible with a plurality of different back configurations (or vice versa). Thus, the back configurations may be with or without hand holds, of different heights, with or without head-rests provided, and so forth.

A related advantage is that the number of pressing dies required to produce the primary components of the seat construction disclosed herein is limited. Two pressing dies would be required for the seat pan (one for the seat pan and one for its respective back-up), and a pair of pressing dies would be required for each different back pan configuration.

Further stemming from this construction is the advantage that the specific spacing between side-by-side seats can be varid by inserting spaces, intermediate arms, control panels, and so forth between two adjacent seats. Thus, while the cost of this construction is limited due to the limited number of pressing dies required to produce the configured main pans and back-up pans, nonetheless a wide range of seating requirements may be satisfied, calling for different spacings, a variety of accessories, and a broad selection of cushion depths, fabric coverings, and so forth.

An additional advantage provided by the construction disclosed herein relates to vehicles such as buses in which wheel wells protrude upwardly into the passenger space. Where the design of the interior of the bus calls for a single or double seat at the location of a wheel well, it is possible to utilize one of the support connections (such as a stanchion) which does not call for support directly from the floor of the vehicle. In this way, it is not necessary to provide a separate, specially-designed seating shape or support frame shape adapted to accommodate the configuration of the wheel well.

Finally, it is pointed out that the seating construction disclosed herein is such that it is not only strong enough to support the loads to which it is normally subjected and which it must resist under applicable specifications, but also is provided with a plurality of attachment structures, locations, threaded inserts and so forth, distributed at a number of different points in the construction, such that the seat can be suspended at the proper location above a vehicle floor from a large number of directions; from either side, from the back, from underneath, and from above (using stanchions). Moreover, it is not necessary that all of the attachment points be utilized, due to the great inherent natural strength of the stressed-skin construction of the seating assembly.

I claim:

1. A frameless, stressed skin seat construction adapted for direct attachment without frame members either to others of its kind or to a support component, comprising:

an integral sheet metal seat pan formed to define (a) inverted U-shaped portions at opposite side for contributing beam strength to the sides, (b) a convex upward cylindrical surface spanning the front for providing load supporting capability to the front, and (c) a concave upward dished portion in the rear half of the seat pan for providing torsion resistance to the seat pan as a whole;

an integral sheet metal back pan formed to define (d) rearward opening U-shaped portions at opposite sides for contributing beam strength to the sides (e) a concave forward dished portion in the lower half of the back pan for providing torsion resistance to the back pan as a whole, and (f) a rearwardly opening U-shaped channel at the top for providing beam strength to the top;

the seat pan and back pan being secured together such that the securement is weaker than the pans themselves, whereby sufficient force exerted to fold the pans together will cause buckling of the securement rather than bending of said pans.

2. The invention claimed in claim 1, in which the securement between the seat pan and the back pan is constituted by overlapping ends of the inverted U-shaped portions of the seat pan, and of the rearward opening U-shaped portions of the back pan, the overlapping ends being attached by rivetting, spot-welding or fasteners.

3. The invention claimed in claim 2, in which the back pan also defines an L-shaped portion spaced below said rearwardly opening U-shaped channel and adapted to receive the upper periphery of a padding member, whereby such padding member does not interfere with the capability of said rearwardly opening U-shaped channel to function as a hand-hold location by which a person may grasp the back of the seat.

4. The invention claimed in claim 3, which there is defined a rearwardly extending recess between the L-shaped portion and the rearwardly opening U-shaped channel for receiving the fingers of a person grasping the back of the seat.

5. The invention claimed in claim 2, which further includes a first back-up pan under the said sheet metal seat pan, and a second back-up pan behind the sheet metal back pan, the back-up pans being affixed to their respective sheet metal pans, but not being affixed to each other.

6. The invention claimed in claim 5, in which each back-up pan is affixed to its respective sheet metal pan at locations adjacent the periphery thereof.

7. The invention claimed in claim 6, in which each back-up pan is affixed to its respective sheet metal pan by roll-forming at adjacent peripheral portions.

8. The invention claimed in claim 7, in which the first back-up pan has two transverse, spaced-apart, downwardly protruding U-shaped channels adjacent the forward and rearward edges respectively, each channel having two spaced-apart apertures, and internally threaded nut means fixed adjacent each aperture within the channel, for receiving a threaded bolt shank.

9. The invention claimed in claim 7, in which the second back-up pan has two internally threaded nut means firmly affixed thereto at spaced locations thereon, the nut means being capable of receiving threaded bolt shanks.

10. The invention claimed in claim 7, in which each back-up pan is spaced from its respective sheet metal pan but includes, at its side edges, at least one outstanding pocket region fitting complementally within the U-shaped portions at opposite sides of the sheet metal pan, each pocket region defining a cavity as seen from beneath the seat pan or behind the back pan, the walls of the cavities having apertures.

11. The invention claimed in claim 7, in which there is a gap between adjacent portions of the two back-up pans, the back pan and seat pan having means for the attachment of padding members, at least some of said last-mentioned means being accessible through said gap, whereby the back pan, the seat pan and the back-up pans may all be assembled together and to a vehicle without padding members being applied until assembly is completed.

12. The invention claimed in claim 2, in which the back pan also defines, at the upper portions of its opposite sides, rearwardly extending and forwardly open U-shaped pockets for receiving the fingers of a person using the upper corners of the back pan for hand-hold locations.

13. A frameless, stress skin double seating arrangement which includes two seat constructions as defined in claim 2, the seat constructions being affixed to each other along adjacent back pans and along adjacent seat pans.

14. The invention claimed in claim 10, in which each side edge of the first back-up pan has a forward and a rearward cavity, while each side edge of the second back-up pan has one cavity.

15. A passenger vehicle having at least one frameless, stress skin double seating arrangement which includes two seat constructions as defined in claim 14, one of said constructions being secured to a wall of said vehicle by fastening members passing through the apertures in the cavities of the respective first back-up pan along one side of said one seat construction, and through aligned openings in the seat pan; the other of said constructions being secured to said one of said constructions (a) by fastening members passing through the apertures in the juxtaposed cavities of the two first back-up pans along the adjacent sides of the seat constructions, and through aligned openings in the seat pans, and (b) by fastening members passing through apertures in the juxtaposed cavities of the two second back-up pans along adjacent sides of the seat constructions, and through aligned openings in the back pans.

16. The invention claimed in claim 15,, in which the double seating arrangement is further supported by a fastening member through the aperture in the cavity of the second back-up pan of said one of said constructions which is on the side remote from said other of said constructions, said last-mentioned fastening member being affixed to said wall of the vehicle.

17. The invention claimed in claim 15, in which the double seating arrangement is further supported by a support member extending from an interior surface of the vehicle to a location on said double seating arrangement which is remote from said one side of said one seat construction.

18. A passenger vehicle having a plurality of interconnected seat constructions as defined in claim 14 the seat constructions being arranged obliquely with respect to a vehicle wall and being interconnected such that any two adjacent constructions face in the same direction but are offset with respect to each other, whereby along their juxtaposed side edges of the seat pans, the forward cavity in the first back-up pan of one construction is aligned with the rearward cavity in the first back-up pan of the other.

19. The invention claimed in claim 15, in which the double seating arrangement is further supported by at least one stanchion member extending from a roof portion of the passenger vehicle to a part of the double seating arrangement which is remote from said wall of said vehicle.

* * * * *